United States Patent [19]

Wiese et al.

[11] Patent Number: 4,577,904
[45] Date of Patent: Mar. 25, 1986

[54] GUIDING SLEEVE FOR HEAD RESTS AT VEHICLE SEATS

[75] Inventors: Heiner Wiese, Hamburg; Rainer Gramss, Norderstedt, both of Fed. Rep. of Germany

[73] Assignee: ITW Ateco GmbH, Norderstedt, Fed. Rep. of Germany

[21] Appl. No.: 574,830

[22] Filed: Jan. 30, 1984

[51] Int. Cl.⁴ .............................................. A47C 7/36
[52] U.S. Cl. ..................................... 297/410; 297/375
[58] Field of Search ................. 297/410; 297/391, 375

[56] References Cited

U.S. PATENT DOCUMENTS

| | | | |
|---|---|---|---|
| 3,544,162 | 12/1970 | Uchiyamada et al. | 297/410 |
| 3,563,602 | 2/1971 | Ohta et al. | 297/410 |
| 4,411,470 | 10/1983 | Nishimura et al. | 297/410 |
| 4,478,456 | 10/1984 | Mitsui | 297/410 |
| 4,483,565 | 11/1984 | Terui et al. | 297/410 |
| 4,489,979 | 12/1984 | Zyngier | 297/410 |

*Primary Examiner*—Francis K. Zugel
*Attorney, Agent, or Firm*—Albert J. Brunett; Thomas W. Buckman

[57] ABSTRACT

A guiding sleeve for head rests at vehicle seats, said sleeve slidingly accommodating a rod of the head rest and having at the upper end thereof an arresting device provided with a handling means and cooperating with an arresting abutment at the lower end of the rod and preventing the rod from being pulled out when the handling means is not actuated, wherein the sleeve bore is provided with an enlargement at the upper end thereof said enlargement accommodating an elongated spring element which has a forward longitudinal side cooperating with the head rest rod and which has a rearward longitudinal side by which it is supported at the wall of the enlargement, with an unlocking element comprised of two parallel-spaced legs arranged in said enlargement, said legs being respectively disposed laterally of the sleeve bore and having the ends thereof cooperating with the ends of the spring element while being adapted to be moved by the handling means towards the spring element in the direction of their longitudinal extension.

5 Claims, 4 Drawing Figures

GUIDING SLEEVE FOR HEAD RESTS AT VEHICLE SEATS

The invention relates to a guiding sleeve for head rests at vehicle seats, said sleeve slidingly accommodating a rod of the head rest and having at the upper end thereof an arresting device provided with a handling means and cooperating with an arresting abutment at the lower end of the rod preventing the rod being pulled out when the handling means is not actuated.

Such guiding sleeves of synthetic material or metal are inserted from above into the backs of the vehicle seats. They enable the accommodation of a rod of a head rest in sliding engagement so that the head rest may be adjusted in height. Through a corresponding frictional engagement or a releasable arresting means the head rest may be adjusted to the respectively desired height. For reasons of safety it is prescribed that the head rest must not be pulled out of the back of the seat even under a corresponding load. For this reason the guiding sleeve has associated thereto an arresting means which cooperates with an arresting abutment at the lower end of the rod. Only through actuation of the handle and the unlocking effected thereby may the rod be readily pulled out of the guiding sleeve.

With known guiding sleeves the actuation of the arresting device has proved to be difficult. It is difficult, above all, to accomplish a complete unlocking by simple manipulation.

The invention is based upon the problem of providing a guiding sleeve for head rests at vehicle seats which, on the one hand, provides for a safe interlocking of the rod against pulling out and, on the other hand, makes possible a simple and effective actuation of the unlocking means.

The above problem is solved in accordance with the invention in that the sleeve bore is provided with an enlargement at the upper end thereof which accommodates an elongated spring element said spring element cooperating by a front longitudinal side thereof with the head rest rod and by a rear longitudinal side thereof being supported at the wall of the enlargement, with an unlocking element arranged in the enlargement said unlocking element comprising two parallel spaced legs respectively disposed laterally of the sleeve bore and having the ends thereof in engagement with the ends of the spring element, while being capable of being moved towards the spring element in the direction of their longitudinal extension.

With the guiding sleeve according to the invention the spring element is variable in width transversely of the longitudinal extension thereof in such a manner that it may be disengaged from the rod by being pressed together transversely of the longitudinal extension. The pressing together of the spring element is effected with the aid of the legs of the unlocking element which simultaneously engage at the respective ends of the spring element. Thereby, the spring element is compressed uniformly, and the shortest possible path of adjustment is required to bring about unlocking. Owing to the engagement of the unlocking element at the spring element the path of adjustment of the unlocking element equals the path of adjustment of the spring in the zone of engagement with the rod. With the aid of the constructional features as described above, thus, a simple and effective unlocking is possible. The spring element at the same time serves for biasing the unlocking element which is actuated from the handling means. The handling means is a button, for example, which projects radially outwards above the enlargement. It goes without saying that the legs of the unlocking element are spaced from each other through a distance greater than the diameter of the guiding sleeve. Also when actuating the unlocking element into the unlocking position the unlocking element must remain clear of the rod of the head rest.

A particularly preferred embodiment of the invention resides in that the unlocking element is U-shaped and the web when in the position of rest forms the handling means while projecting radially outwards from the enlargement. The unlocking element may comprise, for example, a one-piece plastics shaped member which may be inserted into the enlargement via an opening thereof.

According to another embodiment of the invention, provision is made for the legs to have arresting noses at the outer surfaces thereof said arresting noses cooperating with arresting projections of the enlargement in such a manner that the movement of the legs by virtue of the pressure of the spring element is limited in an outward direction. When introducing the unlocking element into the enlargement, thus, the legs are slightly bent towards each other until the arresting noses come to snap behind the arresting projections thereby limiting the position of rest of the unlocking element.

In order to obtain a good guidance of the unlocking element provision is made in another embodiment of the invention for the legs to be guided by means of parallel-spaced wall portions of the enlargement. The guide takes care that with a certain pressure exerted on the unlocking element by hand the forces are applied to the spring element in an approximately uniform distribution thus not jamming the unlocking element in the enlargement by canting.

So that the spring element be safely retained in the enlargement, provision is made in one embodiment of the invention for the enlargement to taper again upwards to the measure of the sleeve bore.

The spring element, according to another embodiment of the invention, is preferably shaped of flat material with two legs bent away in a rearward direction and coming to lie in close contact against a supporting portion of the enlargement. As upon actuation of the spring element the bentaway legs will move relative to the supporting portion, the legs suitably are slightly curved in order to reduce the friction at the supporting portion.

A particularly advantageous embodiment of the spring element resides in that the bent-away legs have a reduced width due to lateral recesses such that the legs intersect in the plane of the intermediate member. In this manner, a uniform formation of the spring element and thus an accurate path of the spring within the zone of engagement with the rod is guaranteed in a particularly simple way.

In order to disengage the legs or the arresting noses, respectively, from the arresting projections, provision is made in another embodiment of the invention for openings to be provided level with the enlargement and opposite the legs of the unlocking element. Via the openings an object may be introduced such as a screw driver, for example, and may force the legs inwards in order to release the unlocking element from the arresting projections.

The guiding sleeve according to the invention allows for easy assembly and simple disassembly of the individual constructional components. Owing to the construction of the spring element and the unlocking element a direct accurate path of spring is provided for an irreproachable unlocking through simple operation of a handling means.

An example of embodiment of the invention will be described in the following in more detail by way of drawings.

Figure 1:
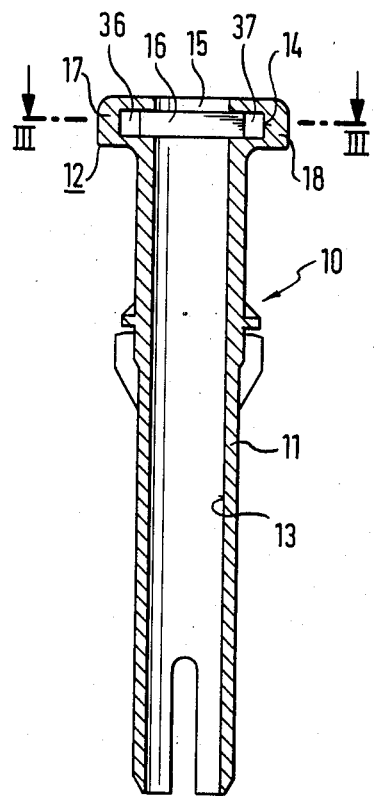
FIG. 1 shows a sectional view of a guiding sleeve according to the invention taken along line 1—1 of the representation shown in FIG. 2.

Prior to enlarging in more detail on the individual representations shown in the drawings it has to be stated that each of the features shown and described is of inventively essential importance by itself or in connection with features of the claims.

Figure 2:
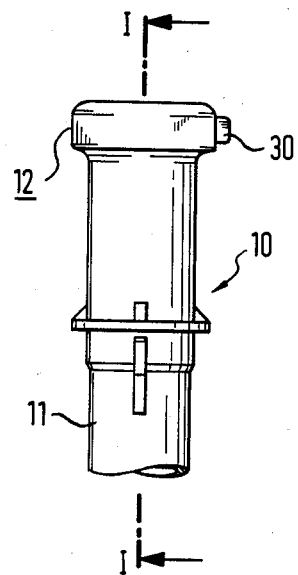
FIG. 2 shows a side view of a guiding sleeve according to FIG. 1.
Figure 3:
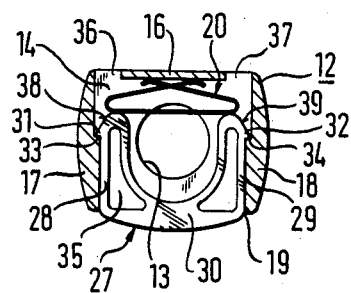
FIG. 3 shows a sectional view of the guiding sleeve according to FIG. 1 taken along line 3—3.

The guiding sleeve shown in FIGS. 1 to 3 is generally designated with 10. It comprises a hollow cylindrical sleeve portion 11 as well as a head 12 radially projecting above the sleeve portion 11. As will be seen form FIG. 3, the head 12 has an approximately rectangular outer contour. As will be recognized from FIG. 1, the cylindrical bore 13 of the sleeve portion 11 merges in the zone of the head 12 into an approximately rectangular enlargement 14 which again narrows at the top to the diameter of the bore 13 as shown at 15. The recess or enlargement 14 is defined at the rear by a rear wall 16 and is limited laterally by side wall portions 17, 18. An opening 19 is provided opposite the rear wall 16 said opening extending the entire width of the head 12.

Figure 4:
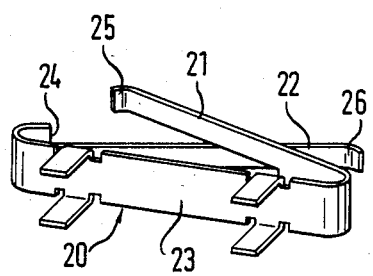
FIG. 4 shows a strongly enlarged representation of a spring element for the arrangement as shown in FIG. 3.

Arranged in the enlargement 14 is a spring element 20 shown in more detail in a perspective view in FIG. 4. The spring element is formed of flat spring steel and consists of two legs 21, 22 bent-away in a rearward direction from an intermediate member 23 and intersecting each other. The intersecting in the plane of the intermediate member 23 is made possible by corresponding incisions in the legs 21, 22 one of them being shown at 24. The ends of the legs are arcuately bent round at 25 and 26, respectively, so that they come to lie in contact against the rear wall 16 with relatively little friction, as shown in FIG. 3. The height or width, respectively, of the intermediate member 23 is slightly less than the height of the enalrgement 14. The spring element 20 is inserted into the enlargement 14 via the opening 19. Furthermore inserted into the enlargement is an unlocking element 27 which comprises two parallel legs 28, 29 interconnected with each other by a web 30 at the one end thereof. The straight outer surfaces of the legs 28, 29 are dimensioned in the front region thereof to fit the enlargement 14, so that the legs 28, 29 are guided by the corresponding inner wall portions of the side walls 17, 18. The legs 28, 29 are provided with arresting noses 31 and 32 in the end regions thereof which snap behind arresting shoulders 33, 34 of the enlargement 14 when the unlocking element 27 is introduced completely into the enlargement 14. During introduction the resilient legs 28, 29 are slightly deformed towards each other, so that the arresting noses 31, 32 may slide along the wall of the enlargement. To save on the material the legs of the unlocking element which comprises a one-piece shaped member of synthetic material, for example, are provided with recesses as shown at 35. The ends of the legs 28, 29 are lying in close contact against the ends of the spring element 20. If, now, a pressure is exerted via the outward rounded web 30 which slightly projects radially outward above the enlargement 14, the legs will exert a pressure on the ends of the spring element compressing the latter by deformation of the legs 21, 22. With a sufficient degree of adjustment, the intermediate portion 23 will get outside the zone of the bore 13, so that an arresting portion provided at the rod of a head rest introduced into the sleeve 10 gets disengaged from the intermediate portion 23. The rod may thus be completely pulled out of the sleeve 10.

The back wall 16 is provided with two openings 36, 37 which are disposed opposite the ends of the legs 28, 29. The ends of the legs are provided laterally with oblique surfaces 37, 38, so that an object introduced via the openings 36, 37 and impinging upon the surfaces 38, 39 may deform the legs in a direction towards each other, in order to disengage the arresting noses 31, 32 from the arresting shoulders 33, 34. In this manner, the unlocking element 27 and also the spring 20 may easily be removed out of the enlargement 14.

Let it still be mentioned that the representation according to FIG. 1 only shows the sleeve itself but not the spring element and the unlocking element.

The spring element may also have a different shape. So, the center piece engaging at the rod need not consist of spring material. It may comprise an elongated rigid member supported at the back side against one or several springs.

We claim:

1. An improved adjustable guiding sleeve wherein the improvement comprises:
   a hollow elongated sleeve;
   a flange integral with said sleeve at one end thereof having an aperture co-axial with the bore of said sleeve and having a narrow rectangular slot extending through said flange, perpendicular to the longitudinal axis of said sleeve and across the aperture of said sleeve said slot being defined by a pair of oppositely facing side walls, top and bottom walls, an end wall and a narrow rectangular opening opposte said end wall;
   a spring biasing member within said slot having a normal and a depressed position and being formed of a resilient elongated base member conforming to the shape of said slot and having a rearwardly bent leg on each of its ends which extend a predetermined distance from said base so that when in its normal position crosses said aperture of said flange a predetermined distance to frictionally engage a member within said sleeve and when in its depressed position no longer crosses said aperture; and
   an actuating means for compressing said biasing member against said end wall to move it from said normal to said depressed position.

2. An improved adjustable guiding sleeve wherein the improvement comprises:
   a hollow elongated sleeve;
   a flange at one end integral with said sleeve having a slot perpendicular to its longitudinal axis; said slot being defined by a pair of oppositely facing side walls, top and bottom walls having apertures therein conforming to the bore of said sleeve, an end wall and an end opening opposite said end wall;

a spring biasing member within said slot having a normal and a depressed position which when in its normal position crosses said apertures a predetermined distance to frictionally engage a member within said sleeve and when in its depressed position no longer crosses said apertures, said spring being formed of a resilient elongated base member conforming to the shape of said slot and having a rearwardly bent leg on each of its ends which extend a predetermined distance from said base so that it crosses said apertures when said legs contact said end wall in their normal position, said legs of said spring biasing member being tapered so that they may cross-cross each other while remaining within said slot and are slightly bent at their respective ends toward said base member; and an actuating means for compressing said spring biasing member against said end wall to move it from said normal to said depressed position.

3. The sleeve of claim 2, wherein said base member is a flat, rectangular, elongated member having tabs at each end extending outward from said base on the side opposite said legs for accommodating said activating member.

4. The sleeve of claim 2, wherein said actuating means is generally U-shaped having a bight with a width and a length conforming to said slot and a resilient leg on each end extending a predetermined distance away from said base to engage said spring biasing member without crossing said apertures said oppositely facing side walls of said slot being ramp surfaces for slidingly engaging said resilient legs of said activating means having recesses which accommodate a stud integral with the end of each of said legs to lock said activating means within said slot.

5. The sleeve of claim 4, wherein said end wall of said slot contains at least one aperture which provides access to said legs of said activating means to permit its removal by releasing said studs from said recesses.

* * * * *